United States Patent [19]

von Arndt et al.

[11] Patent Number: 5,658,990
[45] Date of Patent: Aug. 19, 1997

[54] PREVENTION OF OR REDUCTION IN THE FORMATION OF AMINES AND N-NITROSAMINES DURING THE MANUFACTURE AND USE OF ELASTOMERS

[75] Inventors: Ernst-Moritz von Arndt, Weinheim; Günter Stein, Hemsbach, both of Germany

[73] Assignee: Firma Carl Freudenberg, Weinheim, Germany

[21] Appl. No.: 599,899

[22] Filed: Feb. 12, 1996

[30] Foreign Application Priority Data

Feb. 18, 1995 [DE] Germany .................. 195 05 650.7

[51] Int. Cl.⁶ .................................................. C08C 19/20
[52] U.S. Cl. ...................... 525/124; 525/192; 525/194; 525/352; 524/714
[58] Field of Search .................... 525/124, 192, 525/194, 352; 524/714

[56] References Cited

U.S. PATENT DOCUMENTS

| 3,894,996 | 7/1975 | Srail ........................................ 525/124 |
| 4,244,843 | 1/1981 | Hashimoto et al. ................. 260/5 |

OTHER PUBLICATIONS

Lheureux, M. et al., "Nitrosamines in Rubber Vulcanizate: An Evaluation of Specific Inhibitors", *Kautschuk & Gummi Kunststoffe 43, Jahrgang, Nr.* (Feb. 1990), pp. 107–113.

Primary Examiner—Rachel Gorr
Attorney, Agent, or Firm—Kenyon & Kenyon

[57] ABSTRACT

Monofunctional or multifunctional isothiocyanates having the general formula $$R-(N=C=S)_x$$

where R is any organic remainder; $x \geq 1$, or compounds which form such isothiocyanates under the influence of temperature are used in elastomeric compounds to be vulcanized as inhibitors for amines.

13 Claims, No Drawings

PREVENTION OF OR REDUCTION IN THE FORMATION OF AMINES AND N-NITROSAMINES DURING THE MANUFACTURE AND USE OF ELASTOMERS

BACKGROUND OF THE INVENTION

1. Field of the Invention

The invention relates to the prevention or reduction of amine and N-nitrosamine formation during the production and use of elastomers.

2. Description of Related Art

Volatile N-nitrosamines can be released to the environment from elastomeric articles. These N-nitrosamines in turn can be formed from caoutchouc chemicals (for example activators, accelerators, sulphur donors and retarders) which contain amines in the combined state. N-nitrosamines likewise already form during the processing of caoutchouc compounds. In the formation of these compounds, both $NO_x$ (for example adsorbed on elastomeric constituents or from the surrounding air) and the corresponding secondary amines are involved.

The nitrosamine problem has been known in the rubber industry for many years. The pressure to eliminate carcinogenic N-nitrosamines is being intensified by laws prescribing maximum concentrations. In *Caoutchour+Rubber Plastics*, Vol. 43 (1990), No. 2, pp. 107–113, the use of inhibitors is examined to bond the critical secondary amines. In particular, tests with oxime-blocked isocyanates to inhibit methyl phenylamine from dimethyl diphenyl thiuram disulphide resulted in no reduction in the NMPhA quantity being liberated. Therefore this method is regarded by the authors as ineffective in the case of a dose of blocked isocyanate customary for elastomers.

SUMMARY OF THE INVENTION

An object of the present invention is to specify chemical compounds, hereinafter called amine-inhibitors, whose use results in the blocking of amines forming toxic nitrosamines not only during vulcanization, but also during the storage, assembly and installation of the elastomeric material.

A further object of the invention is the prevention of or marked reduction in the formation of N-nitrosamines during the manufacture and use of elastomers. A further object of the invention is the prevention of or marked reduction in the outgassing of free amines typically formed during the manufacture, storage, transport or installation of the elastomeric parts, as well as in their assembled condition, and consequently the prevention of the subsequent formation of corresponding N-nitrosamines. Yet a further object of the invention is the retention of, or at least only slight impairment of the mechanical-technological properties, the compression set, as well as the durability and functional properties of the vulcanized products.

Another object of the invention is the prevention of, or at least the marked decrease in blooms on the surface of the vulcanized products produced by reaction products from the cross-linking [vulcanization] reactions.

Another object of the invention is to provide inhibitors having high resistance to hydrolysis, alcoholysis or solvolysis and consequently avoidance of negative influences from moisture and corresponding compounding ingredients during the compounding and storage.

These and other objects of the invention are achieved by a method of inhibiting amine formation in an elastomeric compound comprising the step of incorporating into the elastomeric compound: a monofunctional or multifunctional isothiocyanate having the general formula

where R is any organic remainder and $x \geq 1$; or a compound which forms such isothiocyanate under the influence of increased temperature during vulcanization of the elastomeric compound, wherein said isothiocyanate is effective to inhibit amine formation during vulcanization of the elastomeric compound.

DETAILED DESCRIPTION OF THE INVENTION

The invention is based on the use of monofunctional or multifunctional isothiocyanates having the general formula

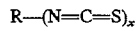

where R is any organic remainder; $x \geq 1$, in elastomeric compounds to be vulcanized as inhibitors for the amines. In another embodiment, compounds are used which first under elevated temperatures, i.e., in general under vulcanization conditions, form chemical substances having the functional isothiocyanate groups according to the above formula necessary to inhibit the amines (for example, thioureas).

The blocking of the isothiocyanate groups is possible due to conversion with active compounds containing hydrogen, represented schematically according to

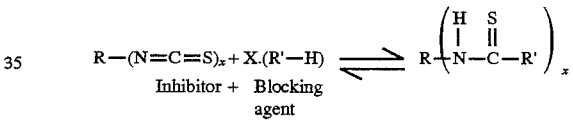

where R and R' are any organic remainder $x \geq 1$.

Of course when using compounds which, under vulcanization conditions, release chemical substances having the functional isothiocyanate groups necessary to inhibit the amines, it should be taken into consideration that the reactivity of the blocking agent R'—H with respect to the isothiocyanate is less than the corresponding reactivity of the amines to be inhibited. Relevant information for the individual compound classes with regard to the variation in their reactivity is inferable from the literatures.

When using compounds which first under vulcanization conditions form chemical substances having the functional isothiocyanate groups necessary to inhibit the amines, it must be taken into consideration that most of these compounds act as a strong accelerator on the course of vulcanization. This effect, when it is too strongly pronounced, leads to a premature onset of the vulcanization reaction to such an extent that the workability of the elastomeric compounds is no longer assured.

For this reason, it is necessary to check and select the compounds used, which release the inhibitors shown, with a view that they reduce the prevulcanization time $t_{s2}$ according to DIN 53 529 of an unvulcanized elastomeric compound that is compounded meeting the requirements of actual practice by no more than 50% compared with the corresponding time without the addition of the specified compounds.

A standardized testing method is expediently used in which, admixed to 177 g of a mixture of the Standard- Reference-Elastomer SRE-NBR 28 (DIN 53 538) is a quantity of the compound forming isothiocyanate during vulcanization that is equivalent to the theoretically maximum quantity of separable amines. This corresponds to a quantity of 26.5 mmol isothiocyanate equivalent. The prevulcanization behavior is determined by the vulcanization isotherms with the aid of a rotorless curemeter in accordance with DIN 53 529 at a temperature of 160° C. Serving as the measurement criterion is the prevulcanization time $t_{s2}$, corresponding to the increase in isotherms from the minimum of the torque-time-characteristic curve after the starting of the rotor up to the rise in viscosity by 2 dNm.

If primary amines are used for the chemical blocking of the isothiocyanates and they are released during the splitting under vulcanization conditions, in the event of a possible nitrosation, they will compete with the secondary amines to be inhibited forming from the elastomeric compound. Since primary amines with respect to the nitrosation agent $NO_x$ as a rule have a higher reactivity than the secondary amines, preferably the harmless nitrosation products of these primary amines will form. Instead of those, ammonia can also form which, in the same way, will compete with the secondary amines.

In the case of the compounds releasing isothiocyanates, those can be present in dimeric, oligomeric or polymeric form.

The dosage of the amine inhibitor selected is carried out according to its number of active or activable NCS groups and according to the quantity of amines released under vulcanization conditions. In so doing, one will mostly choose a dosage stoichiometric to the theoretically maximum possible quantity of amines capable of being released.

Because of the increase in concentration, a higher isothiocyanate-(donor)-dosage results in accelerated inhibiting of the amines. In contrast to that, hypostoichiometric dosages can result in only partial inhibiting of the amines which, for example, can be useful for economic reasons.

If constituents are contained in the rubber compound which, in competition with the amines to be inhibited, can likewise react with isothiocyanates, the isothiocyanate or the isothiocyanate donor should be dosed correspondingly higher in order to unfold its full effectiveness. Such constituents can be, for example, alcohols, phenols or amines.

Because of its functional —SH - group, mercaptobenzothiazole can also react with isothiocyanates. Therefore, with the present invention, one is in the position to effectively block this toxic elastomeric constituent as well.

The formation of products from the cross-linking reactions which, because of their poor solubility in the elastomer matrix lead to blooms on the surface of the vulcanized product, is suppressed by the use of the inhibitors according to the invention, even after several weeks of storage. In this manner, skin irritations or allergic reactions are avoided in handling the elastomeric parts.

In comparison with isocyanates, isothiocyanates are distinguished by a higher resistance to hydrolysis, alcoholysis and solvolysis. Because of this, a negative influence on the inhibitor effectiveness from moisture and corresponding compounding ingredients is largely avoided during the storage and processing of the compound.

A detailed insight into the effectiveness of the amine inhibitors and their influence on the mechanical-technological and other important properties of the elastomeric vulcanized products can be seen from the following examples.

EXAMPLES

Since in all statements concerning effectiveness, it is sufficient in each case to differentiate only comparatively between elastomeric materials with amine-inhibitor-additive and without, it was important first and foremost to pay attention to the best possible comparability of the measured values.

In detail, the compound series named in the later examples were subjected to the following tests:

Test Methods and Measuring Principles

A 1 Free Amines in the Press Vapor

Suctioning off of air on the vulcanization press in the region of the open vulcanization appliance. Suction power: 500 ml/min; Suction time: 2 h. Adsorption of the amines by means of prepared silica gel in adsorption tubes, desorption with hydrochloric acid, quantitative evaluation after derivatization with dansyl chloride (5-dimethylaminonaphthalene-1-sulphonyl chloride, DNSCl) with HPLC. Data in mg amine/m$^3$ air.

A 2 Amines Outgassing from the Vulcanized Product

Reduction of a freshly produced testing plate (200 mm×200 mm×2 mm) into square pieces with an edge length of 5 mm, filling into a gas-washing bottle, passing through of 100 l air with a suction power of 750 ml/min; adsorption of the amines by means of prepared silica gel in adsorption tubes, desorption with hydrochloric acid, quantitative evaluation after derivatization with dansyl chloride (5-dimethylaminonaphthalene-1-sulphonyl chloride, DNSCl) with HPLC. Data in mg amine/m$^3$ air.

NA 1 Nitrosamines in the Press Vapor

Suctioning off of air on the vulcanization press in the region of the open vulcanization appliance. Suction power: 1660 ml/min; Suction time 2 h; Adsorption of the nitrosamines into conventional adsorption tubes suitable for this. Desorption by means of solvent. Gas-chromatographic separation, TEA-detector (thermal energy analyzer) with mass-spectrometric safeguarding. Data in µg N-nitrosamine/tube.

NA 2 Nitrosamines in the Vulcanized Product

Procedure in conformity with D. C. Havery, T. Fazio; *Food Chem. Toxicol.* 20 (1982) 6, pp. 939–944: Solvent extraction of the vulcanized product, steam distillation of the nitrosamines, solvent extraction of the aqueous distillate, concentration of the organic extract, gas-chromatographic separation, TEA detector with mass-spectrometric safeguarding. Data in mg N-nitrosamine/kg.

PREPARATION OF THE COMPOUNDING VARIANTS

For optimal comparability of results, the following procedure was chosen in the examples specified:

Preparation of a master compounding batch in the closed mixer

Mixing up of the cross-linking substances on a laboratory mill

Division of the batch according to the number of amine inhibitor variants to be tested Mixing in of the respective inhibitor on a laboratory mill. In this manner, variations and influences because of different conditions during the compounding were avoided to the greatest possible extent.

If the melting point of the inhibitor substance was higher than the temperature of about 90° C. reached on the mixing mill, it was necessary to deviate from this procedure. In these cases, the inhibitor was already added in the closed mixer. Moreover, in the case of blocked inhibitors, the temperature in the closed mixer should be above the melting point, but below the splitting temperature.

Substitutionally for the sulphur-vulcanizable, double-bond-containing caoutchoucs, nitrile-butadiene caoutchouc (NBR) having an average acrylonitrile content was used. At the same time, the same basic formulation was used in all the examples. Sulphur was already added toward the end of the mixing process in the closed mixer for better distribution capability.

| Basic Formulation (Quantity data in phr = parts by weight per 100 parts by weight caoutchouc): | |
|---|---|
| Acrylonitrile-butadiene-copolymer, 28% ACN content | 100 |
| Zinc oxide (90%) | 5.5 |
| Stearic acid | 1 |
| Zinc salt of 4- and 5-methyl mercaptobenzimidazole | 1 |
| Paraffin wax | 1 |
| Carbon black N 550 | 60 |
| Sulphur | 0.5 |
| Total: | 169 |

EXAMPLE 1

The following compoundings show the influence of a selection of compounds according to the claims on the vulcanization characteristics and the properties of the vulcanized product in the case of a cross-linking [vulcanizing] system A, consisting of (data in phr)

| TMTD | 1.5 | ⇒ | DMA | ⇒ | NDMA |
|---|---|---|---|---|---|
| DMPhTD | 1.5 | ⇒ | MPhA | ⇒ | NMPhA |
| MBS | 1 | ⇒ | MOR | ⇒ | NMOR |
| DTDM | 1 | ⇒ | MOR | ⇒ | NMOR, | and the corresponding amines or N-nitrosamines resulting therefrom.

The abbreviations for the amines used herein are those commonly used in the rubber and plastics industry, namely: dimethylamine (DMA), methyl phenylamine (MPhA), morpholine (MOR), and dibenzylamine (DBA). The corresponding N-nitrosamine for each amine is abbreviated with an "N" preceding each amine abbreviation. The abbreviations for the components of the vulcanizing systems used herein are also those commonly used in the rubber and plastics industry, namely: tetramethylthiuram disulphide (TMTD), dimethyl diphenyl thiuram disulphide (DMPTD), morpholinebenzthiacylsulfenamide (MBS) and dithiodimorpholine (DTDM).

Type and quantity (phr) of the amine inhibitors used:

| | Variant | | | | | | | |
|---|---|---|---|---|---|---|---|---|
| Amine inhibitor | A1 | A2 | A3 | A4 | A5 | A6 | A7 | A8 |
| Cyclohexylisothiocyanate (CITC) | — | 4.7 | 3.1 | — | — | — | — | — |
| Phenylisothiocyanate (PITC) | — | — | — | 4.4 | — | — | — | — |
| Allyl isothiocyanate (AITC) | — | — | — | — | 3.3 | — | — | — |
| N,N'-diphenylthiourea (DPTU) | — | — | — | — | — | — | 7.6 | — |
| Phenylthiourea (PTU) | — | — | — | — | — | 5.1 | — | — |
| Tricyclohexythiourea (TCTU) | — | — | — | — | — | — | — | 10.7 |

CITC, PITC and AITC: These are free isothiocyanates. DPTU and PTU: These are isothiocyanates blocked with aniline (DPTU) or ammonia (PTU) which bring about a shortening of the prevulcanization time $t_{s2}$ with a test mixture SRE-NBR 28 to perceptibly under 50% of the corresponding time for the inhibitor-free compound.

TCTU: This is an isothiocyanate blocked with dicyclohexylamine which shortens the prevulcanization time $t_{s2}$ with SRE-NBR 28 by perceptibly less than 50% in comparison with the corresponding time in the case of the inhibitor-free compound.

Measuring results obtained on the vulcanized products:

| | Variant | | | | | | | |
|---|---|---|---|---|---|---|---|---|
| | A1 | A2 | A3 | A4 | A5 | A6 | A7 | A8 |
| Mechanical-technological properties | | | | | | | | |
| Hardness Shore A | 77 | 75 | 76 | 75 | 75 | 76 | 74 | 73 |
| Stretch value with 100% extension MPa | 7.6 | 7.9 | 7.8 | 6.6 | 7.7 | 6.8 | 7.2 | 6.4 |
| Tensile strength MPa | 21.4 | 22.1 | 21.5 | 21.4 | 22.9 | 20.5 | 20.9 | 21.1 |
| Ultimate elongation % | 248 | 250 | 254 | 263 | 271 | 241 | 274 | 293 |
| Compression Set | | | | | | | | |
| 24 h/100° C. % 25% def. | 10 | 10 | 9 | 9 | 11 | 8 | 12 | 15 |
| Storage in Hot Air, 3 Days/100° C. | | | | | | | | |
| Hardness Shore A | 80 | 78 | 79 | 78 | 79 | 78 | 77 | 77 |
| (Δ Hardness Shore A) | (+3) | (+3) | (+3) | (+3) | (+4) | (+2) | (+3) | (+4) |
| Tensile strength MPa | 23.3 | 23.4 | 23.4 | 22.9 | 23.4 | 23.6 | 21.5 | 22.2 |
| (Δ Tensile strength %) | (+9) | (+6) | (+9) | (+7) | (+2) | (+15) | (+3) | (+5) |
| Ultimate elongation % | 211 | 200 | 211 | 213 | 225 | 207 | 219 | 237 |
| (Δ Ultimate elongation %) | (−15) | (−20) | (−17) | (−19) | (−17) | (−14) | (−20) | (−19) |
| Storage in Hot Air, 14 Days/100° C. | | | | | | | | |
| Hardness Shore A | 83 | 82 | 82 | 82 | 83 | 82 | 82 | 82 |
| (Δ Hardness Shore A) | (+6) | (+7) | (+6) | (+7) | (+8) | (+6) | (+8) | (+9) |
| Tensile strength MPa | 22.0 | 22.5 | 20.9 | 22.5 | 24.0 | 21.5 | 21.1 | 21.1 |
| (Δ Tensile strength %) | (+3) | (+2) | (−3) | (+5) | (+5) | (+5) | (+1) | (±0) |
| Ultimate elongation % | 156 | 140 | 147 | 155 | 163 | 149 | 151 | 161 |
| (Δ Ultimate elongation %) | (−37) | (−44) | (−42) | (−41) | (−40) | (−38) | (−45) | (−45) |

Amines Outgassing from the Vulcanized Product (Testing Method A2)

Quantity data in mg Amine/m$^3$.

The values stated in parentheses indicate the relative portion in % in comparison with Variant A 1 (without amine inhibitor). Vulcanization conditions: 185° C./4 min.

| | Variant | | | | | | | |
|---|---|---|---|---|---|---|---|---|
| Amine | A1 | A2 | A3 | A4 | A5 | A6 | A7 | A8 |
| DMA | 1.3 | <0.1 | <0.1 | <0.1 | <0.1 | <0.1 | <0.1 | <0.1 |
| MOR | 1.0 | <0.1 | <0.1 | <0.1 | <0.1 | <0.1 | <0.1 | <0.1 |
| MPhA | 15.1 | 3.8 | 7.9 | 2.7 | 4.9 | 12.3 | 13.7 | 10.8 |
| | | (25) | (52) | (18) | (32) | (81) | (91) | (72) |

Nitrosamines in the Press Vapor
(Testing Method NA 1)

Quantity data in µg nitrosamine/tube.
Vulcanization conditions: 185° C./4 min.

|  | Variant | | |
|---|---|---|---|
| Nitrosamine | A 1 | A 3 | A 4 |
| NDMA | <0.01 | <0.01 | <0.01 |
| NMOR | <0.01 | <0.01 | <0.01 |
| NMPhA | 25 | 21 | 15 |

The following can be noted:

The mechanical-technological properties, the permanent compression set and the ageing in hot air are not influenced, or are influenced only slightly by the amine inhibitors used.

The quantities of amines released from the vulcanized products to the surrounding air as reaction products of the vulcanizing agents used are markedly reduced in comparison with the variant without amine inhibitor in the instance of the methyl phenylamine. In the case of dimethylamine and morpholine, the quantities of amines released are even below the detection limit of the analytical determination procedure used.

The determination of the quantities of N-nitrosamines emitted during vulcanization allows no clear-cut differentiation, since already in the case of the variant without amine inhibitor additive (A1), just as in the case of the tested variants with amine inhibitor additive, the NDMA quantity and the NMOR quantity were below the detection limit. With regard to the NMPhA quantity, a slight drop was found, though here the values were at a very high level.

Since the release of methyl phenylamine or NMPhA was only able to be partially suppressed with the inhibitor quantities used, an excess of amine inhibitor was available for the two amines dimethylamine and morpholine because of the stoichiometric dosage of inhibitors relative to the total quantity of releasable amines. Apparently to completely reduce the released quantity of methyl phenylamine or the corresponding N-nitrosamine, a marked excess of amine inhibitor(s) is necessary to increase the inhibiting speed, if need be at an even higher vulcanization temperature. For the aforesaid reasons, in the following Example 2 the use of the accelerator DMPhTD was dispensed with completely.

EXAMPLE 2

The influence of the inhibitor CITC is shown for a vulcanization system B, consisting of (data in phr)

| TMTD | 2.5 | ⇒ | DMA | ⇒ | NDMA |
| MBS | 1.5 | ⇒ | DMA | ⇒ | NDMA |
| DTDM | 1.5 | ⇒ | MOR | ⇒ | NMOR |
| TBTD | 1.5 | ⇒ | DBA | ⇒ | NDBA | and the corresponding amines or N-nitrosamines resulting therefrom. At the same time, the amines selected can be regarded as representative examples for critical secondary amines occurring in the rubber industry.

Type and quantity (phr) of the amine inhibitor used:

|  | Variant | | |
|---|---|---|---|
| Amine inhibitor | B 1 | B 2 | B 3 |
| CITC | — | 1.8 | 6.6 |

In so doing, the dosage of the inhibitor in Variant B3 is selected stoichiometrically to the theoretically maximum quantity of amines forming. The mechanical-technological properties, the compression set and the ageing behavior of the three variants show only slight variations from each other, just as the corresponding variants from Example 1, so that listing is dispensed with.

Free Amines in the Press Vapor (Testing Method A 1)

Quantity data in mg amine/m$^3$.

The values stated in parentheses indicate the relative portion in percentage in comparison with Variant B 1 (without amine inhibitor). Vulcanization conditions: 185° C./4 min.

|  | Variant | | |
|---|---|---|---|
| Amine | B 1 | B 2 | B 3 |
| DMA | 2.7 | 2.5 (93) | 2.3 (85) |
| MOR | 5.3 | 4.3 (81) | 2.6 (49) |
| DBA | 0.8 | 0.7 (88) | 0.5 (63) |

Amines Outgassing from Vulcanized Product
(Testing Method A 2)

Quantity data in mg amine/m$^3$.
The values stated in parentheses indicate the relative portion in percentage in comparison with Variant B 1 (without amine inhibitor). Vulcanization conditions: 185° C./4 min.

|  | Variant | | |
|---|---|---|---|
| Amine | B 1 | B 2 | B 3 |
| DMA | 10.4 | 2.6 (25) | <0.1 |
| MOR | 8.7 | 2.7 (31) | <0.1 |
| DBA | 1.2 | 0.3 (25) | <0.1 |

The results listed in the tables show the following:

The emission of the amines DMA, MOR and DBA formed from the vulcanization accelerators can be markedly reduced with increasing dosage of the amine inhibitor.

In the case of Variant B3, the quantity of amines outgassing from the vulcanized product is reduced in each case below the detection limit of the analysis method used. Therefore nearly a complete suppression of amine emission also results in the storage, dispatching and in the assembled condition of the elastomer part, and consequently of the formation of corresponding N-nitrosamines as well.

What is claimed is:

1. A method of inhibiting secondary amine formation during vulcanization of an elastomeric compound with a sulfur donating accelerator which forms secondary amines during vulcanization, comprising the step of incorporating into an elastomeric compound: a monofunctional or multifunctional isothiocyanate having the general formula

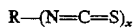

where R is any organic remainder and $x \geq 1$; or a compound which forms such isothiocyanate under the influence of increased temperature during vulcanization of the elastomeric compound, wherein said isothiocyanate is effective to inhibit secondary amine formation during vulcanization of the elastomeric compound.

2. The method according to claim 1, wherein the isothiocyanate is a dimeric, oligomeric or polymeric isothiocyanate.

3. The method according to claim 1, wherein the isothiocyanate is chemically blocked by primary amines and wherein the chemically blocked isothiocyanate is incorporated into the elastomeric compound.

4. The method according to claim 1, further comprising the step of vulcanizing the elastomeric compound, wherein the isothiocyanate groups of the isothiocyanate or the groups which are converted to isothiocyanate groups of the compound which forms said isothiocyanate during vulcanization are stoichiometrically dosed essentially in correspondence with the amines which would be released under vulcanization conditions.

5. The method according to claim 1, further comprising the step of vulcanizing the elastomeric compound, wherein the isothiocyanate groups of the isothiocyanate or the groups which are converted to isothiocyanate groups of the compound which forms said isothiocyanate during vulcanization are hypostoichiometrically dosed essentially in correspondence with the amines which would be released under vulcanization conditions.

6. The method according to claim 1, further comprising the step of vulcanizing the elastomeric compound, wherein the isothiocyanate groups of the isothiocyanate or the groups which are converted to isothiocyanate groups of the compound which forms said isothiocyanate during vulcanization are hyperstoichiometrically dosed essentially in correspondence with the amines which would be released under vulcanization conditions.

7. The method according to claim 4, wherein the isothiocyanate is a dimeric, oligomeric or polymeric isothiocyanate.

8. The method according to claim 4, wherein the isothiocyanate is chemically blocked by primary amines and wherein the chemically blocked isothiocyanate is incorporated into the elastomeric compound.

9. The method according to claim 5, wherein the isothiocyanate is a dimeric, oligomeric or polymeric isothiocyanate.

10. The method according to claim 5, wherein the isothiocyanate is chemically blocked by primary amines and wherein the chemically blocked isothiocyanate is incorporated into the elastomeric compound.

11. The method according to claim 6, wherein the isothiocyanate is a dimeric, oligomeric or polymeric isothiocyanate.

12. The method according to claim 6, wherein the isothiocyanate is chemically blocked by primary amines and wherein the chemically blocked isothiocyanate is incorporated into the elastomeric compound.

13. The method according to claim 2, wherein the isothiocyanate is chemically blocked by primary amines and wherein the chemically blocked isothiocyanate is incorporated into the elastomeric compound.

* * * * *